US009821320B2

United States Patent
Ellis et al.

(10) Patent No.: US 9,821,320 B2
(45) Date of Patent: Nov. 21, 2017

(54) WET ELECTROSTATIC PRECIPITATOR AND RELATED METHODS

(71) Applicant: RSR Technologies, Inc., Dallas, TX (US)

(72) Inventors: Timothy W. Ellis, Dallas, TX (US); Henry V. Krigmont, Seal Beach, CA (US)

(73) Assignee: RSR TECHNOLOGIES, INC., Dallas, TX (US)

( * ) Notice: Subject to any disclaimer, the term of this patent is extended or adjusted under 35 U.S.C. 154(b) by 186 days.

(21) Appl. No.: 14/341,873

(22) Filed: Jul. 28, 2014

(65) Prior Publication Data

US 2015/0040759 A1   Feb. 12, 2015

Related U.S. Application Data

(63) Continuation of application No. 13/037,921, filed on Mar. 1, 2011, now Pat. No. 8,790,444.

(51) Int. Cl.

| | |
|---|---|
| B03C 3/16 | (2006.01) |
| B01D 53/14 | (2006.01) |
| B01D 53/64 | (2006.01) |
| B03C 3/14 | (2006.01) |
| B03C 3/145 | (2006.01) |
| B03C 3/49 | (2006.01) |

(52) U.S. Cl.
CPC ............ B03C 3/16 (2013.01); B01D 53/1456 (2013.01); B01D 53/64 (2013.01); B03C 3/14 (2013.01); B03C 3/145 (2013.01); B03C 3/49 (2013.01); *B01D 2252/103* (2013.01); *B03C 2201/08* (2013.01); *B03C 2201/10* (2013.01)

(58) Field of Classification Search
USPC ...... 95/63–66, 69, 71, 72, 78; 96/52, 53, 55, 96/57, 60, 74; 261/94–98
See application file for complete search history.

(56) References Cited

U.S. PATENT DOCUMENTS

| | | | | |
|---|---|---|---|---|
| 2,024,226 | A | * 12/1935 | Irwin ..................... | B01D 47/06 55/DIG. 38 |
| 2,273,194 | A | * 2/1942 | Hedberg .................. | B03C 3/16 55/DIG. 38 |
| 2,730,195 | A | * 1/1956 | Roberts .................... | B03C 3/16 55/DIG. 38 |
| 4,256,468 | A | * 3/1981 | Mazer ...................... | B03C 3/00 55/435 |
| 4,305,909 | A | * 12/1981 | Willett ................... | B01D 47/06 422/169 |
| 4,364,910 | A | * 12/1982 | Willett ................... | B01D 47/06 423/243.01 |

(Continued)

FOREIGN PATENT DOCUMENTS

JP   61-15750   * 1/1986

*Primary Examiner* — Duane Smith
*Assistant Examiner* — Sonji Turner
(74) *Attorney, Agent, or Firm* — K&L Gates LLP (57) ABSTRACT

An emissions reduction stack includes a conditioning section, collector section utilizing a Wet Electrostatic Precipitator (WESP), and output section. A chemically active aqueous stream is introduced into an incoming process stream in order to saturate the stream and produce a fog stream wherein water is condensed on the surface of particulates. The process of condensation increases the efficiency of the particulate filtration process conducted by the WESP.

15 Claims, 3 Drawing Sheets

(56) References Cited

U.S. PATENT DOCUMENTS

| | | | | |
|---|---|---|---|---|
| 5,254,155 A * | 10/1993 | Mensi | ................... | B03C 3/16 96/100 |
| 5,282,885 A * | 2/1994 | Cameron | ................ | B03C 3/014 95/66 |
| 5,391,220 A * | 2/1995 | Patterson | ............... | B01D 45/08 55/462 |
| 5,762,662 A * | 6/1998 | Wieser-Linhart | .. | B01D 17/0202 210/167.01 |
| 5,827,352 A * | 10/1998 | Altman | ................. | B01D 53/10 95/234 |
| 6,110,256 A * | 8/2000 | Reynolds | ................ | B03C 3/019 95/4 |
| 6,797,035 B2 * | 9/2004 | Baldrey | ................. | B03C 3/013 423/395 |
| 7,297,182 B2 * | 11/2007 | Ray | ...................... | B01D 47/06 95/58 |
| 8,790,444 B2 | 7/2014 | Ellis et al. | | |
| 2003/0000384 A1 | 1/2003 | Tomimatsu et al. | | |
| 2005/0229780 A1 * | 10/2005 | Spink | ................... | B01D 46/003 95/65 |
| 2007/0079704 A1 * | 4/2007 | McAnespie | ............. | B03C 3/16 96/53 |
| 2008/0257157 A1 * | 10/2008 | Huang | ................. | F23J 15/025 96/53 |
| 2010/0199428 A1 * | 8/2010 | Guguin | ............... | A61G 7/0507 5/430 |

* cited by examiner

WET ELECTROSTATIC PRECIPITATOR AND RELATED METHODS

FIELD OF THE INVENTION

The present invention relates generally to the reduction of toxic air emissions and, more specifically, to wet electrostatic precipitators used in industrial manufacturing facilities.

BACKGROUND

In 1987, the California legislature adopted the Air Toxics "Hot Spots" Information and Assessment Act (or AB 2588). AB 2588, and similar legislations, require industrial manufacturers that generate toxic air emissions to notify the public in the immediate area that there may be a risk of exposure to known carcinogenic substances. In addition, AB 2588 requires facilities to submit an air toxics inventory report ("ATIR"). A facility's priority score is calculated from information in the ATIR. A facility with a priority score greater than ten (10) must provide a health risk assessment ("HRA"), following guidelines established by the State of California Office of Environmental Health Hazard Assessment, and supplemented by Air Quality Management District guidelines. If the risk reported in the HRA exceeds specific thresholds, then the facility is required to provide public notice to the affected community.

Quemetco Inc., a secondary lead recycling facility in City of Industry CA., operates under California's Proposition 65 legislation along with AB 2588. California Proposition 65 requires community notification if a facility emits substances known or identified by the state to cause cancer. The public awareness or notification requirements of the program specify quarterly reporting, direct mail campaigns and media announcements (via newspaper) to those individuals living in the area who may be affected by the emissions. Legislation under AB 2588 also requires identified facilities to conduct HRAs which determine cancer risk and cancer burden as well as an index to acute and chronic health risks as defined in the HRA rules. The value for determining the HRA are specified in the modeling protocols and values included in the regulations.

In 1992, the California legislature added a risk reduction component, the Facility Air Toxic Contaminant Risk Audit and Reduction Plan (or SB 1731), which required the District to specify a significant risk level, above which risk reduction would be required. In Rule 1402, the South Coast Air Quality Management District Governing Board set the significant risk level at a cancer risk of 100 in a million, and a total chronic or acute hazard index of 5.0. The Board also established action risk levels at a cancer burden of 0.5, a cancer risk of 25 in a million, and a hazard index of 3.0. To better explain what these numbers mean the following definitions from the regulations is provided:

Maximum Individual Cancer Risk ("MICR"): the estimated probability of a potentially maximally exposed individual contracting cancer as a result of exposure to toxic air contaminants over a period of 70 years for residential receptor locations. The MICR for worker receptor locations must also be calculated.

Cancer Burden: the estimated increase in the occurrence of cancer cases in a population subject to an MICR of greater than or equal to one in one million ($1 \times 10^{-6}$) resulting from exposure to toxic air contaminants.

Acute Hazard Index: the ratio of the estimated maximum one-hour concentration of a toxic air contaminant at a receptor location to its acute reference exposure level.

Chronic Hazard Index: the ratio of the long-term level of exposure to a toxic air contaminant for a potentially maximally exposed individual to the chronic reference exposure level for the toxic air contaminant.

Public notification and a public meeting are required for facilities with cancer risks greater than or equal to ten in a million or non-cancer acute or chronic hazard index greater than one. Rule 1402 requires annual public notice until the facility gets below the action risk levels.

Secondary Lead Smelters produce Pb (lead) and lead alloys from lead-bearing scrap materials. The main source of feed material being spent batteries. The process is generally characterized by three operations: scrap pretreatment, smelting, and refining. Scrap pretreatment operations include the separation of metal and non-metal components from lead-bearing scrap. Operations include battery breaking, plastic separation and removal, and lead crushing. Smelting produces lead by the oxidation of lead sulphates, followed by carbothermic reduction of oxides to elemental lead.

Two lead bearing streams are produced by the furnace. The first is a metallic lead sent directly to the refinery for the production on Sb (Non-Antimonial alloy). The second is a matte which is charged to an electric arc furnace used to recover lead content as high Non-Antimonial content alloy. One result of these processes is the emission of several contaminants to the ambient air. Particulate metals such as lead, Arsenic, Nickel, and Cadmium are emitted from the scrap treatment, smelting, and refining operations as are organics such as benzene, toluene, and xylene. Emissions of nitrogen oxides, sulfur dioxide, and carbon monoxide occur as a result of combustion, smelting, and refining processes. Historically, emissions from secondary lead smelters have been controlled through the use of wet scrubbers for sulfur dioxide reduction, thermal oxidizers to reduce carbon monoxide, and baghouses to reduce emissions of particulate metals.

In view of the foregoing, there is a need in the art for a method to reduce emissions which minimizes employee exposures, and addresses local air toxin regulations and anticipated pollutant reductions in national ambient air quality standards.

SUMMARY OF THE INVENTION

Exemplary embodiments of the present invention provide an emissions reduction system and method in which a stack housing comprises a conditioning section, collector section utilizing a Wet Electrostatic Precipitator (WESP), and output section. A chemically active aqueous stream is introduced into an incoming process stream in order to saturate the stream and produce a fog stream wherein water is condensed on the surface of particulates in the incoming stream. The process of condensation increases the efficiency of the particulate filtration process conducted by the WESP.

In an exemplary methodology of the present invention, acid and particulate laden gas enters the conditioning section for pretreatment to remove acid gas and reduce heavy particulate loading. Further gas saturation and pretreatment takes place while in contact with the chemically active liquor that continuously washes a packed media bed scrubber prior to remaining particulate laden gas flowing upwardly into a WESP. There, particles are instantly charged by the system's high intensity ionizing corona and, as gas flows through the collection area, the highly charged particles are electrostatically driven to the grounded collecting tube electrodes. Entrained pollutant particles are then removed by intermittent irrigating/flushing water.

Embodiments of the present invention lower the emissions of toxins, such as lead, arsenic, cadmium, and nickel, by typically 90% or more.

DESCRIPTION OF ILLUSTRATIVE EMBODIMENTS

Illustrative embodiments and related methodologies of the present invention are described below as they might be employed in reducing toxic emissions produced in industrial manufacturing facilities, such as Lead recycling facilities. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
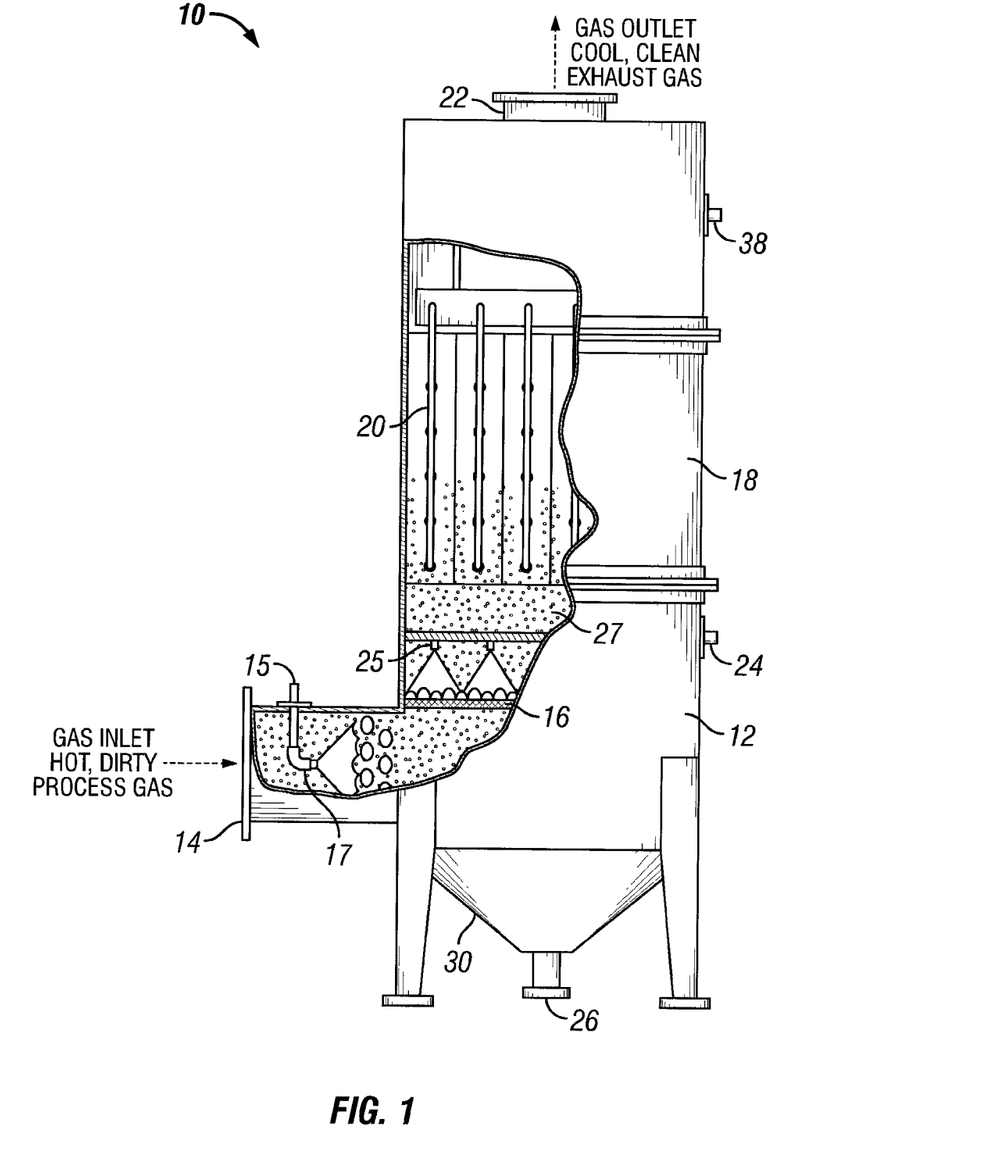
FIG. 1 illustrates a WESP stack housing according to an exemplary embodiment of the present invention.

FIG. 1 illustrates a wet electrostatic precipitator ("WESP") according to an exemplary embodiment of the present invention whereby WESP 10 acts as a "polishing" (i.e., used as a secondary filtration system) control device to capture low concentrations of specific contaminants present in the gas stream as condensable particulates. However, those ordinarily skilled in the art having the benefit of this disclosure realize WESP 10 could also be used as a primary filtration system. WESP 10 incorporates an up-flow design wherein hot process gases, containing any number of toxic particulates (e.g., molecules, nano-sized particles, etc.), enter via the lower end and are routed upwards. Exemplary particulates can contain compounds or elemental forms of lead, arsenic, nickel, cadmium, selenium oxide, and sulfur dioxide.

At the lower end of WESP 10, a conditioning section 12, acting as an absorber/condenser/quencher sharing a common housing, receives inlet gases from various sources introduced via gas inlet manifold 14. Adjacent gas inlet manifold 14 is an inlet header 15 comprising one or more multiple throat venturis 17 which supply fluid in order to saturate the incoming gas stream. The fluid/liquor supplied to venturies 17 is an aqueous solution having a low concentration of Sodium Carbonate (other alkali/alkali earth carbonates or hydroxides may also be used) which is used to remove sulfur dioxide from the gas stream.

The saturated gas stream them flows up into packed media bed 16, which, in this exemplary embodiment, comprises tower packing material such as random Jaeger Raschig Super Ring packing. Fog headers 24 (connected to a fluid supply) are located above packed media bed 16 in order to provide a fine mist, or water vapor, via a plurality of nozzles 25. Media bed 16 provides gas-liquid contact by the film of liquor/liquid that forms on the surface of the media. As the gas continues to move upwardly, it flows up through media bed 16 against a counter-current flow of chemically active liquor supplied via nozzles 25 (and the liquor received from further processing above as will be later described). The liquor circulating system of conditioning section 12 consists of a circulating pump (not shown), liquid reservoir 30 in the bottom of WESP 10, piping system (not shown), controls (not shown), and spray nozzles 25. Spray nozzles 25 are designed to provide full coverage across the entire cross-section of conditioning section 12 to provide intimate contact between the gas and liquor.

The liquor flows downward through the media bed 16 and collects in the bottom of WESP 10 from where it is transported to an external blowdown tank via drain 26, where a pump circulates the liquor through a heat exchanger, and back to the top of the spray nozzles 25 above packed bed 16, via fog headers 24. A level control (not shown), positioned within reservoir 30 works in conjunction with a pump to ensure the correct level of liquid is maintained. Thus, the excess liquid is pumped out of the WESP 10 to the blow down tank.

Due to the cooling of the hot incoming gas stream and the introduction of the liquor, water begins to condense on the particulates in the gas stream, thus forming a fog in conditioning section 12. The fog is formed when droplets of $H_2O$ form (e.g., 1-25 um) in conditioning section 12, typically when the temperature is less than 5° C. lower than the dew point, as would be understood by one ordinarily skilled in the art having the benefit of this disclosure. As the gas flows upwardly, it is cooled by direct contact with the re-circulated liquor. Since the gas enters conditioning section 12 in an unsaturated state, the liquid saturates and cools the gas below adiabatic saturation. Water is condensed from the gas as it cools. As such, conditioning section 12 performs both sensible cooling of the gas (i.e., heat transfer) as well as mass transfer (i.e., condensation of water and absorption).

As the water condenses, a weak acid begins to form. In order to control the amount of acid present and impurity level in the system, make-up reagent is added to the liquor used in the system. The more reagent that is added, the lower the acid concentration, and level of impurities in conditioning section 12.

The design of conditioning section 12 takes into account both the temperature difference between the weak acid and the gas, which is the driving force available for heat transfer, as well as the difference in partial pressure of water vapor that is the driving force for mass transfer. The packing in media bed 16 provides the contact surface area for mass and heat transfer. The gas retention time must be sufficient to allow the metallic vapors and inorganic compounds to be condensed into fine particles that will facilitate their removal in downstream equipment. The gas retention time based on the inlet gas flow is typically about 3.0 seconds.

An expansion area 27 is provided between fog header 24 and collector section 18, which is located above nozzles 25. The fog stream, in which water has condensed on the surface of the particulates, is produced here due to two reasons: the first is the drop in pressure and, second, a drop in temperature of the gas stream (it cools as it rises through WESP 10).

As the water in the gas stream evaporates, it lowers the temperature of the stream, thereby causing the particulates to be absorbed into the condensing water. Also, the particulates may act as nuclei which aids in the condensation of $H_2O$. In addition, the pressure decreases due to the cooling of the stream. Thereby, the combination of the water saturation, temperature, and pressure of the gas stream as it exits media bed 16 result in water condensation and, thus, the creation of the fog stream. Sensors (not shown) are located within conditioning section 12 to assure the correct temperatures, humidities, and air pressures are maintained to facilitate creation of the fog stream, as would be understood by one ordinarily skilled in the art having the benefit of this disclosure. Without the process of condensation of the particles in expansion area 27 (i.e., production of fog stream), the particulates of metallic and inorganic material would be too small to be captured in collector section 18, as will be described below. A control system is utilized to monitor/control the condensation process as would be understood by one ordinarily skilled in the art having the benefit of this disclosure.

As previously described, the quench process of conditioning section 12 results in the condensation of gas into the liquid. Process liquid from the conditioning section 12, introduced via nozzles 25, is collected in reservoir 30 and recycled. New liquid is constantly introduced, and reagent is added on demand using a dosing pump controlled by a pH monitor. As previously described, the liquor falling from conditioning section 12 is sent to the blow down (storage) tank before being sent to the facility recycle/reuse system and/or the facilities effluent treatment system.

Accordingly, conditioning section 12 provides adiabatic saturation of the incoming gas, partial cleaning of the gas, residence for the condensation of metallic vapors and particles to facilitate their subsequent removal in collector section 18, absorption of residual sulfur dioxide in the gas stream, and condensation of liquid contained in the incoming gas stream. By the time the gas has reached collector section 18, it has been cooled to below its adiabatic saturation temperature, and is in the form of a fog.

Referring further to FIG. 1, to enhance particulate metals control, through the use of nozzles 25 and venturis 17, conditioning section 12 ensures the flow of inlet gas is water saturated and evenly distributed as it moves through expansion section 27 to collector section 18 above. As the gas stream cools in conditioning section 12, water begins to condensate on the sub-micron particulate metals in the gas stream, resulting in the creation of the fog, which results in increased particle size and higher collection efficiencies in collector section 18. Additionally, gas volume is reduced, thus allowing collector section 18 to be smaller than would otherwise be needed and ensures the greatest possible capture of condensable compounds, for example, prior to entering collector section 18.

After passing through conditioning section 12 (where the gas has been transformed into a fog stream as previously described), the fog stream enters collector section 18. Collector section 18 comprises a wet electrostatic precipitator having an array of collecting tubes 20 with high voltage electrodes running through the center of each tube 20, as understood in the art. Particulate collection in this area involves three steps. Initially, the particles in the fog stream are given a negative charge by an ionizing corona produced by the electrode. Next, the electrical field between the electrode and the tube wall causes the charged particles to migrate to and accumulate on the tube walls. Finally, accumulated particulates are periodically washed from the tube walls into reservoir 30 at the bottom of WESP 10 using nozzles (not shown) connected to wash headers 38.

As stated, collection section 18 comprises a wet electrostatic precipitator operating with super saturated air streams (100% relative humidity), i.e., the fog stream. In this exemplary embodiment, the wet electrostatic precipitator is a vertical up-flow hexagonal tube type precipitator having a series of collecting tubes 20. The vapor pressure of the aqueous fog stream is controlled by temperature and the chemical composition, as the addition of soluble species affect the partial pressure of water available from the solution, as would be understood by one ordinarily skilled in the art having the benefit of this disclosure. Lowering the vapor pressure of water in the fog stream flow aids in the removal of particles by increasing coalescence.

Referring to the exemplary embodiment of FIG. 2, collector section 18 is a hexagonal tubular precipitator consisting of an array of tubes 20 having rigid discharge electrodes 32 and collecting electrodes 34. Collecting electrodes 34 are in the shape of a six-sided hexagon with rigid mast discharge electrodes 32 located in the center of each cylinder. Discharge electrodes 32 are in the form of a rigid mast with discs with sharp corona generating discharge points. The discharge electrodes 32 virtually eliminate maintenance, since there are no broken wires to replace, while the hex-tubular configuration lessens sparking and shorting of the cells. The hexagonal shape is chosen in this exemplary embodiment because these geometries are much more space efficient than the round shape, and produce a greater collection efficiency in a given volume. WESP 10 uses rigid mast high intensity ionizing discharge electrodes 32 designed for generation of a concentrated corona field. This special design ensuing a higher current and field strength results in a higher particle migration velocities that equate into a higher efficiency.

Collecting electrodes 34 are earthed and the discharge electrodes 32 are connected to high voltage power supply 36 to create a strong electric field inside each tube 20. The high voltage insulators, which support the high-voltage discharge electrode system, are kept clean continuously using a purge-air system as understood in the art. Gases in the fog stream are ionized as they flow through the electrical field, thereby negatively charging both aerosol and dust particles. Solid particulate matter and mist droplets that enter the electrostatic section are charged by the high voltage and current produced by the electrode and collected on the grounded hexagonal tubes 20. Collected particulates are then flushed down into the reservoir 30 using liquid introduced via spray nozzles connected to wash headers 38 located at the top and directly below the mist eliminator section 22. The rinsing process operates on a periodic, predetermined schedule.

When the collecting electrode 34 is grounded and a high negative voltage is applied to discharge electrode 32, a corona discharge is generated from discharge electrode 32. This corona discharge fills the precipitator space with ions and electrons, as illustrated in FIG. 2. When gas laden with dust (and mist), i.e., the fog stream, is introduced into this precipitator space, dust (and mist) in the fog stream is negatively charged. The charged dust (and mist) moves towards collecting electrode 34 by Coulomb force accompanying electrostatic aggregating action, and adheres to the dust-collecting electrode (known as "precipitation"). Thereafter, the adherent dust (mist) loses its negative charge on the collecting electrode 34. Due to its own weight and the washing water, the dust (and mist) rinsed off the collecting electrodes 34, falls into reservoir 30 and is subsequently pumped away. Moreover, the liquor produced during the rinse falls down through conditioning section 12 further aiding in the creation of the fog stream, thereby adding to the efficiency of the contaminant removal process.

As the treated exhaust exits collection section 18, it passes through mist eliminator 22 for water droplet removal prior to entering the discharge stack. Mist eliminator 22, as understood in the art, provides a large surface area in a small volume to collect liquid without substantially impeding gas flow. Thus, as the fog stream passes through mist eliminator 22, liquid is removed.

Figure 2:
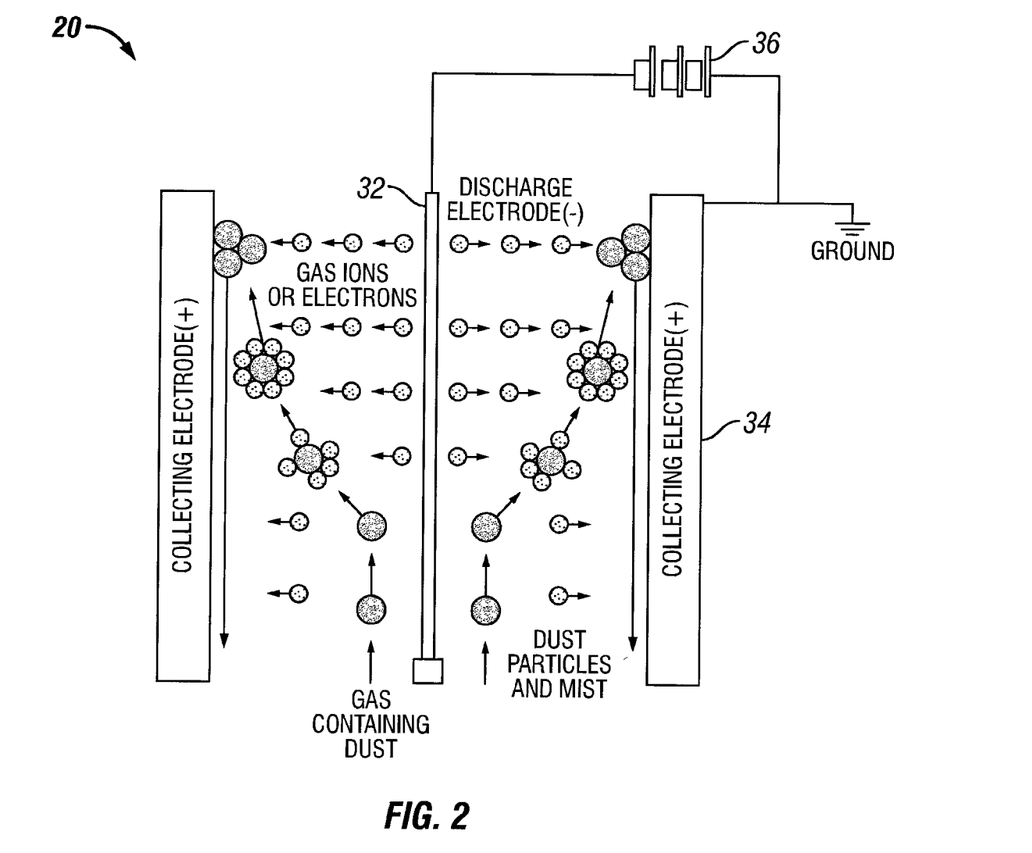
FIG. 2 illustrates the filtration process of the WESP according to an exemplary embodiment of the present invention.

Efficient overall performance of WESP 10 depends heavily upon having similar gas conditions at inlet manifold 14 of each WESP 10 and at the inlet of each hexagonal tube 20. The present invention is designed with uniform gas velocity distribution through the electrical fields, to avoid high-velocity areas that would cause loss of already collected material or re-entrainment. The uniform gas flow distribution is especially important while collecting fine, sub-micron particulate at the high collection rates. The uniform gas flow distribution across each individual module is also a vital parameter from the mist eliminator performance point of view. Although some cross flow traversing may take part in conditioning section 12, there will be no cross flow after the fog stream enters tubes 20 of collector section 18. Consequently, if uneven gas flow exits the tubes 20, it will cause inefficiencies in mist eliminator 22 due to the excessive local gas velocities. In addition, uniform gas flow distribution will result in a lower pressure loss if compared with the highly turbulent uneven gas flow. On the other hand, excessive local velocities in mist eliminators 22 will result in added pressure losses.

In the present invention, to achieve a smooth and uniform gas distribution throughout WESP 10, the gases enter via a specially designed multi-stage gas distribution devices ensuring first, balanced and uniform gas flow distribution between the various WESP units, and, second, to achieve a uniform gas flow distribution across the entire unit cross-section within each individual module. The gas flow distribution system incorporates the first stage represented by a perforated plate (not shown) located at each WESP gas inlet manifold followed by the internal gas directional devices (not shown) represented by the set of the flat baffle plates arranged in so called a "chicken ladder" fashion. The latter will ensure that the gas flow is uniform and evenly directed upwards through the conditioning section towards the collection section.

Figure 3:
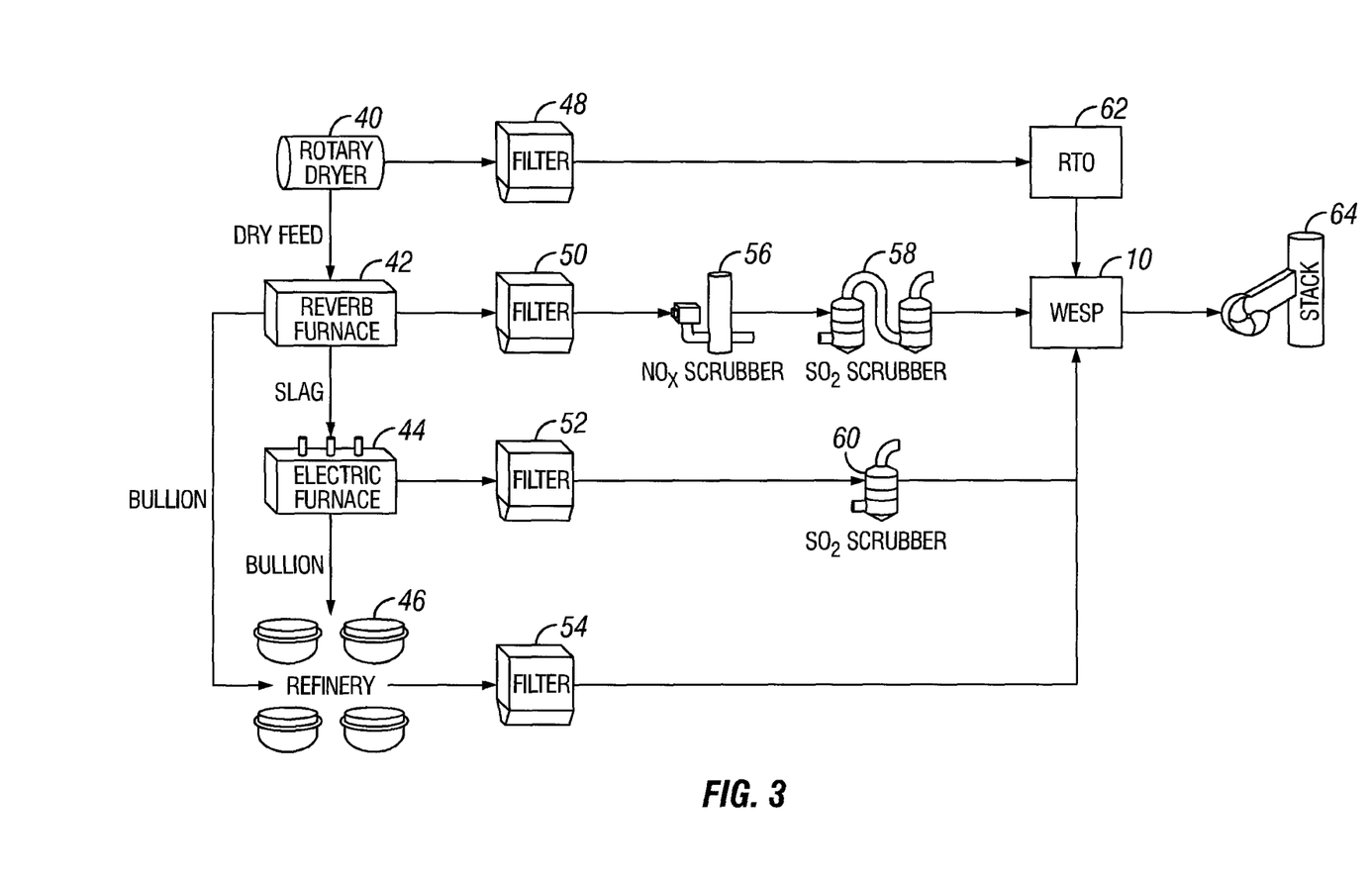
FIG. 3 illustrates a filtration system utilizing the WESP of FIG. 1 according to an exemplary embodiment of the present invention.

Referring to the exemplary embodiment of FIG. 3, an exemplary facility utilizing the present inventive method would consist of WESP 10 used to treat the combined stack gases of the four major facility processing units. These are the kiln/rotary dryer 40, reverberatory furnace 42, electric arc furnace 44, and refinery 46. Note that in this embodiment, reverberatory furnace 42 acts as a primary reduction system while electric arc furnace 44 acts as a secondary reduction system. Those ordinarily skilled in the art having the benefit of this disclosure realize there are a variety of systems, such as a blast or rotary furnace, which could be used either as a primary or secondary reduction system.

Further referring to this embodiment, WESP 10 may consist of five separate WESP units, thereby allowing one to be cleaned while the others are still operational. All four process streams are initially treated via filters 48, 50, 52, 54. The process stream of reverberatory furnace 42 also goes through NO$_x$ scrubber 56 and SO$_2$ scrubber 58. The process stream of electric furnace 44 also goes through SO$_2$ scrubber 60. The process stream of kiln 40 is further processed in regenerative thermal oxidizer ("RTO") 62 before entering inlet 14 of WESP 10 (along with the other 3 process streams).

All four process gas streams enter inlet manifold 14 and are further processed prior to being released through one common stack 64. As stated, prior to entering inlet manifold 14, the process stream from kiln 40 is routed through RTO 62, which is used to reduce volatile organics. Gas treated by the RTO is cooled using a quencher prior to introduction into inlet manifold 14. The exemplary facility is designed to operate efficiently with four units operating so that the fifth unit can be taken off line as necessary for periodic inspection and maintenance, while the other units remain operational. However, please note the WESP of the present invention can be utilized as a stand-alone unit, in combination with other processing/filtration units, or as a primary filtration unit, as would be understood by one of ordinary skill in the art having the benefit of this disclosure.

Because reducing the calculated HRA cancer risk and cancer burden associated with emissions at facilities is a goal of the present invention, design of WESP 10 is based upon emissions of those contaminants which were regarded as primary contributors to potential risk. The cancer risk and cancer burden estimates are based on facility emissions and a modeling and risk assessment program known as the Hotspots Analysis and Reporting Program. Emission rates were established through a rigorous stack testing program with all test protocols and test results reviewed and approved by the South Coast Air Quality Management District (Diamond Bar, Calif.).

The pre-project estimate of cancer risk was 22.1 cancer cases in one million exposed individuals over a 70-year evaluation period. Pre-project cancer burden has been determined to have an index of 1.15. This index is less indicative of population exposure to cancer risk where a higher number indicates a greater potential risk.

During testing of the present invention, approximately 85 compounds were evaluated as potential cancer, chronic health risk, or acute health risk contributors. Of these 85 compounds, ten contributed greater than 99% of the potential cancer risk and were selected as high priority for reduction. These ten compounds appear in Table 1 below. The design of the present invention was considered to be an excellent control candidate to target compounds such as arsenic, lead, cadmium, and nickel. Arsenic was expected to be greatly reduced in conditioning section 12 while the other particulate metals compounds were expected to be removed in the collection section 18. The kiln was determined through testing to be the primary contributor of 1,3-butadiene emissions. After construction of WESP 10, a series of tests were performed between November 2008 and June 2009 to determine the effectiveness of the process. The chart below reflects the emissions levels prior to and after use of WESP 10 of the present invention with or without the use of an RTO.

TABLE 1

Pre and Post Inventive Emission Levels

| | Emission (Lbs/Year) | | % Emission |
|---|---|---|---|
| Element/Compound | Prior Art Process | Present Invention | Reduction |
| Arsenic (As) | 96.0 | 4.6 | 95 |
| 1,3, Butadiene | 2024.9 | 33.3 | 98 |
| Cadmium (Cd) | 6.6 | 0.1 | 98 |
| Chromium (Cr) | 0.3 | 0.1 | 76 |

TABLE 1-continued

Pre and Post Inventive Emission Levels

| Element/Compound | Emission (Lbs/Year) | | % Emission Reduction |
| --- | --- | --- | --- |
| | Prior Art Process | Present Invention | |
| Dioxins | 4.0E−04 | 8.3E−07 | 100 |
| Benzene | 1653.1 | 89.8 | 95 |
| Lead (Pb) | 615.0 | 0.8 | 100 |
| Formaldehyde | 5815.9 | 915.4 | 84 |
| Acetaldehyde | 3996.9 | 0.0 | 100 |
| Nickel (Ni) | 7.1 | 0.5 | 93 |

As a result of the substantial reduction in emissions from the targeted contributors to potential risk (through use of the present invention), post-project estimated cancer risk dropped by approximately 80.1% to 4.4 cancer cases in one million exposed individuals over a 70-year evaluation period. Cancer burden was reduced by approximately 98% to 0.023. Since the dose-response relationship for each targeted substance may not be linear at low levels, the reductions in HRA cancer risk from emissions of each of the targeted substances may even be greater than these estimates would suggest. Additionally, the application of the present invention allows facilities to obtain emissions levels below those requiring notification under the Prop 65 safe harbor levels.

The present inventive emission control technology takes an incoming gas stream, at an elevated temperature with low relative humidity, adds moisture and lowers the temperature, to allow for condensation of particles which can be collected electrostatically. Two integrated control mechanisms are necessary: one which controls temperature and humidification condensation of the gas stream; and a second of controlling air inputs and outputs via manipulation of the fan speed. As previously described, humidification puts condensable water into the gas stream and cools the gas flow by evapotransperation. Soluble species in the gas flow, e.g. sulfur dioxide, $SeO_2$, etc., are adsorbed in the aqueous droplets upon their formation. This produces an ionic electrolyte solution, i.e. chemical ionic species dissolved in the droplet, which can actively absorb more water from the fog stream, thus further reducing the humidity of the flow. Thus, the formation of particles and their physiochemical/electrostatic properties are modified in-situ. To accomplish this effectively, an automatic control scheme is necessary to take full advantage of the process possibilities.

The present inventive technology and method can be applied to single or multiple WESP units operating in series or parallel configuration. Process water, in reservoir 30, exits WESP 10 to a heat exchanger to remove heat from the process water, thereby stabilizing its temperature. Prior to reentering WESP 10, chemicals are added to the process water to control the pH, e.g. $Na_2CO_3$, NaOH, and provide reactive chemical moieties to aid in precipitation of chemical species for removal in WESP 10. Process water then reenters WESP 10 where it is sprayed onto the packed media bed 16.

An exemplary system utilizing the present invention will now be described. Please note, however, one ordinarily skilled in the art having the benefit of this disclosure will realize any variety of system may be designed based upon operational requirements. Several control systems are integrated into WESP 10 for process control. A differential pressure transmitter adjacent eliminator 22 is used to measure the pressure drop between the inlet 14 and outlet duct to WESP 10 to assure proper gas velocity and temperature.

In doing so, valves are used to control the air to actuate the inlet/outlet dampers for flow control. The valves/dampers used to control the air also actuate the makeup water valves which are supplied to entrap particulates. Valves control the air to actuate the valves that provide cleaning water to the wet electrostatic precipitators in collector section 18 and mist eliminator 22.

Thermocouples are used to measure the temperature of the outlet gas leaving WESP 10 and to provide feedback for the flow of the cooling tower fan. Manual or automatic valves are used to control the air to actuate the outlet dampers. A level control and level switches are used to monitor the liquid level in reservoir 30 and to provide feedback for the control of the make-up water valves and the WESP blow down valves (not shown). Chemical metering valves are used to control the flow of sodium bicarbonate (soda ash) into the WESP recirculation loop. Flow meters are used to measure the cleaning water flow rate to the nozzles 24 and 38. Flow meters are used to measure the air flow rate through WESP 10.

Process water is pumped out of reservoir 30 where it is separated into three streams. The first stream bypasses the heat exchangers; the second stream is piped to the blow down tank, with its flow rate controlled by the water level in the basin; and the third stream enters the heat exchangers, whereby it cooled by water supplied from a cooling tower. Process water exits the heat exchanger, merges with the heat exchanger bypass stream and returns to the WESP unit(s). The cooling tower pump transfers water from the cooling tower basin to each of the heat exchangers via a common header, as well as pumping a portion of the basin to the drain as blowdown.

The cooling tower fan modulates to change the temperature of the cooling tower water, and thus balance the heat throughout the WESP system. Centrifugal pumps to control the flow of process water to the heat exchangers. A pH sensor is used to detect the relative acidity of the process water and to provide feedback to the chemical metering valves. Pneumatically operated ball valves with positioners modulate the flow of blow down from the WESP units. A flow meter is used to provide feedback as to the combined WESP blow down flow rate.

A fan driven by a variable frequency drive ("VFD") with communication modules permit Ethernet communications between the VFD and the control system to control the flow of air into the cooling tower. The WESP blow down tank stores blow down water from WESP 10 for reuse. Part of the water from the blow down Tank is used to fill the existing Soda Ash Mix Tank. Water is pumped to the Soda Ash Mix Tank at the discretion of the operator. The rest of the water from WESP Blow down Tank is used to dilute the soda ash in the Soda Ash Day Tank.

The Soda Ash Day Tank provides dilute sodium bicarbonate (soda ash) to WESP 10 via a recirculation loop. The Soda Ash Day Tank is filled with water from the WESP Blow down Tank and the existing Soda Ash Mix Tank. Refills are automatic and based on level control. A mixer is provided to produce a homogenous mixture of diluted soda ash. Diluted soda ash is thereby pumped via a recirculation loop to all WESP units. Flow meters monitor the flow rate of water from the WESP Blow down Tank to the Soda Ash Mix Tank. Valves control the air to actuate the water fill valve for the WESP Soda Ash Day Tank. A mixer is applied to mixing the contents of the WESP Soda Ash Day Tank. Level transmitters to monitor the level in the WESP Soda Ash Day Tank and to provide feedback for the refill function. Centrifugal pumps are used to pump chemical to the WESP units via a recirculation loop with flow meters to monitor the flow rate of chemical through the recirculation loop.

An exemplary embodiment of the present invention provides an apparatus to reduce emissions, the apparatus comprising a stack housing having a lower and upper end; an inlet at the lower end to receive a process stream; a first mechanism to introduce a first aqueous stream into the process stream, the first mechanism being located adjacent the inlet; a media bed located above the inlet; a second mechanism to introduce a second aqueous stream into the process stream, the second mechanism being located above the media bed; an expansion area located above the second mechanism; a wet electrostatic precipitator located above the expansion area; and an outlet at the upper end to release the process stream. In another embodiment, the first mechanism to introduce the first aqueous stream is a multiple throat venturi system. In yet another embodiment, the media bed is comprised of packing material. In yet another, the apparatus comprises a reservoir located at the lower end of the stack housing.

In another embodiment, the reservoir is connected to a recycling system which recycles fluid from the first and second aqueous steams for further use. In yet another, the second aqueous stream is a fine mist. In yet another exemplary embodiment, the process stream rising from the expansion area comprises particulates having water condensed thereto. In another, the particulates are at least one of lead, selenium oxide, arsenic, nickel, cadmium, benzene, toluene, zylene, nitrogen oxide, sulfur dioxide, or carbon monoxide. In yet another, the process stream is emitted from a lead smelting facility. In yet another process stream, the process stream is received from at least one of a baghouse, kiln, primary reduction furnace, or a secondary reduction furnace.

An exemplary methodology of the present invention provides a method to reduce emissions, the method comprising the steps of (a) receiving a process stream into a lower end of a stack housing, the process stream comprising a gas; (b) introducing a first aqueous stream into the process stream, thereby producing a saturated process stream; (c) passing the saturated process stream up through a media bed; (d) introducing a second aqueous stream into the saturated process stream; (e) passing the saturated process stream up into an expansion area; (f) condensing water on a surface of a particulate in the saturated process stream, thereby creating a fog stream; (g) passing the fog stream up into a wet electrostatic precipitator; (h) removing the particulates from the fog stream, thereby creating a filtered stream; and (i) releasing the filtered stream out of an upper end of the stack housing. In another methodology, step (a) further comprises the step of receiving the process stream from a lead smelting facility. In yet another, step (a) further comprises the step of receiving the process stream from at least one of a baghouse, kiln, a primary reduction system, or a secondary reduction system.

Another exemplary embodiment of the present invention provides an apparatus to reduce emissions, the apparatus comprising an inlet to receive a process stream; a first mechanism to introduce a first aqueous stream into the process stream; a media bed; a second mechanism to introduce a second aqueous stream into the process stream; an expansion area located above the second mechanism; a wet electrostatic precipitator; and an outlet to release the process stream. In another embodiment, the first mechanism to introduce the first aqueous stream is a multiple throat venturi system. In yet another embodiment, the media bed is comprised of packing material. In yet another, the apparatus further comprises a reservoir located at the lower end of the apparatus.

In another, the reservoir is connected to a recycling system which recycles fluid from the first and second aqueous steams for further use. In yet another embodiment, the second aqueous stream is a fine mist. In another embodiment, the process stream rising from the expansion area comprises particulates having water condensed thereto. In yet another embodiment, the particulates are at least one of lead, selenium oxide, arsenic, nickel, cadmium, benzene, toluene, zylene, nitrogen oxide, sulfur dioxide, or carbon monoxide. In another embodiment, the process stream is emitted from a lead smelting facility. In yet another embodiment, the process stream is received from at least one of a baghouse, kiln, primary reduction system, or a secondary reduction system.

Another exemplary methodology of the present invention provides a method to reduce emissions, the method comprising the steps of (a) receiving a process stream into a housing, the process stream having particulates therein; (b) condensing water onto a surface of the particulates, thereby creating a fog stream; and (c) passing the fog stream through a wet electrostatic precipitator, thereby filtering the particulates from the fog stream. In another method, step (b) comprises the steps of introducing a first aqueous stream into the process stream, thereby producing a saturated stream; passing the saturated stream up through a media bed; introducing a second aqueous stream into the saturated stream; and passing the saturated stream up into an expansion area. In another methodology, step (a) further comprises the step of receiving the process stream from a lead smelting facility. In yet another, step (a) further comprises the step of receiving the process stream from at least one of a baghouse, kiln, reverbaratory furnace, rotary furnace, blast furnace, electric furnace, refinery, or regenerative thermal oxidizer. In yet another exemplary methodology, step (c) further comprises the steps of filtering at least one of lead, selenium oxide, arsenic, nickel, cadmium, benzene, toluene, zylene, nitrogen oxide, sulfur dioxide, or carbon monoxide from the fog stream.

Although various embodiments and methodologies have been shown and described, the invention is not limited to such embodiments and methodologies and will be understood to include all modifications and variations as would be apparent to one skilled in the art. For example, the present invention could be utilized as a polishing unit or at some other filtration step along the process. In addition, the present invention could be used to filter a variety of other particulates, in addition to those described herein. Therefore, it should be understood that the invention is not intended to be limited to the particular forms disclosed. Rather, the intention is to cover all modifications, equivalents and alternatives falling within the spirit and scope of the invention as defined by the appended claims.

What we claim is:

1. An apparatus to reduce emissions, the apparatus comprising:
    an inlet to receive a process stream;
    a first mechanism to introduce a first aqueous stream into the process stream;
    a media bed located above the inlet and the first mechanism;
    a second mechanism to introduce a second aqueous stream into the process stream;
    an expansion area located above the second mechanism;
    a wet electrostatic precipitator; and
    an outlet to release the process stream.

2. An apparatus as defined in claim 1, wherein the first mechanism to introduce the first aqueous stream comprises a multiple throat venturi system.

3. An apparatus as defined in claim 1, wherein the media bed comprises a packing material.

4. An apparatus as defined in claim 1, further comprising a reservoir located at a lower end of the apparatus.

5. An apparatus as defined in claim 4, wherein the reservoir is connected to a recycling system which recycles fluid from the first and second aqueous steams for further use.

6. An apparatus as defined in claim 1, wherein the second aqueous stream comprises a fine mist.

7. An apparatus as defined in claim 1, wherein the process stream rising from the expansion area comprises particulates having water condensed thereto.

8. An apparatus as defined in claim 7, wherein the particulates comprise at least one of lead, selenium oxide, arsenic, nickel, cadmium, benzene, toluene, xylene, nitrogen oxide, sulfur dioxide, or carbon monoxide.

9. An apparatus as defined in claim 1, wherein the process stream is emitted from a lead smelting facility.

10. An apparatus as defined in claim 1, wherein the process stream is received from at least one of a baghouse, kiln, primary reduction system, or a secondary reduction system.

11. A method to reduce emissions, the method comprising the steps of:
   (a) receiving a process stream through an inlet into a housing, the process stream having particulates therein;
   (b) introducing an aqueous stream into the process stream, thereby producing a saturated stream;
   (c) passing the saturated stream up through a media bed located above the inlet and the aqueous stream and condensing water onto a surface of the particulates, thereby creating a fog stream; and
   (d) passing the fog stream through a wet electrostatic precipitator, thereby filtering the particulates from the fog stream.

12. A method as defined in claim 11, wherein step (c) further comprises the steps of:
   introducing a second aqueous stream into the saturated stream; and
   passing the saturated stream up into an expansion area.

13. A method as defined in claim 11, wherein step (a) further comprises the step of receiving the process stream from a lead smelting facility.

14. A method as defined in claim 11, wherein step (a) further comprises the step of receiving the process stream from at least one of a baghouse, kiln, reverberatory furnace, rotary furnace, blast furnace, electric furnace, refinery, or regenerative thermal oxidizer.

15. A method as defined in claim 11, wherein step (d) further comprises the steps of filtering at least one of lead, selenium oxide, arsenic, nickel, cadmium, benzene, toluene, xylene, nitrogen oxide, sulfur dioxide, or carbon monoxide from the fog stream.

* * * * *